(12) United States Patent
Nistor et al.

(10) Patent No.: US 9,639,343 B2
(45) Date of Patent: May 2, 2017

(54) METHOD FOR ALTERING EXECUTION OF A PROGRAM, DEBUGGER, AND COMPUTER-READABLE MEDIUM

(71) Applicants: Mihail-Marian Nistor, Bucharest (RO); Teodor Madan, Bucharest (RO); Dragos Miloiu, Banesti (RO)

(72) Inventors: Mihail-Marian Nistor, Bucharest (RO); Teodor Madan, Bucharest (RO); Dragos Miloiu, Banesti (RO)

(73) Assignee: NXP USA, INC., Austin, TX (US)

( * ) Notice: Subject to any disclaimer, the term of this patent is extended or adjusted under 35 U.S.C. 154(b) by 113 days.

(21) Appl. No.: 14/528,451

(22) Filed: Oct. 30, 2014

(65) Prior Publication Data
US 2016/0062875 A1 Mar. 3, 2016

(30) Foreign Application Priority Data
Aug. 29, 2014 (RO) .............................. A 2014 00660

(51) Int. Cl.
*G06F 9/45* (2006.01)
*G06F 9/445* (2006.01)
(Continued)

(52) U.S. Cl.
CPC .................. *G06F 8/65* (2013.01); *G06F 9/48* (2013.01); *G06F 11/3644* (2013.01); *G06F 8/68* (2013.01)

(58) Field of Classification Search
CPC ............. G06F 11/3664; G06F 11/3636; G06F 11/362; G06F 11/3644; G06F 8/41; G06F 11/3656; G06F 11/3471
See application file for complete search history.

(56) References Cited

U.S. PATENT DOCUMENTS

| | | | | |
|---|---|---|---|---|
| 2005/0166094 A1* | 7/2005 | Blackwell | ........... | G06F 11/3664 714/38.14 |
| 2008/0244243 A1* | 10/2008 | Kalra | ................ | G06F 11/3644 712/225 |

(Continued)

FOREIGN PATENT DOCUMENTS

EP          0699996 A1       3/1996

OTHER PUBLICATIONS

Ping Chen et al., Instantly Obsoleting the Address-code Associations: A New Principle for Defending Advanced Code Reuse Attack, 2015, retrieved online on Dec. 29, 2016, pp. 1-23. Retrieved from the Internet: <URL: https://arxiv.org/ftp/arxiv/papers/1507/1507.02786.pdf>.*

(Continued)

*Primary Examiner* — Thuy Dao
*Assistant Examiner* — Hanh T Bui

(57) ABSTRACT

A method for altering execution of a program on a computer. The program resides in a memory unit that has a logical address space assigned thereto. The method comprises: operating the computer to start executing the program; operating the computer to suspend execution of the program; selecting a patch insertion address within a logical address range of the program, saving the original code residing at the patch insertion address; generating a patch routine; writing a jump instruction to the patch insertion address, thus overwriting said original code, wherein the jump instruction is arranged to instruct the computer to jump to a start address of the patch routine; and operating the computer to resume execution of the program. The patch routine is arranged to prompt the computer to: save a current context of the program; execute a user code; restore the saved context of the program; and execute a surrogate code.

10 Claims, 3 Drawing Sheets

(51) Int. Cl.
*G06F 9/48* (2006.01)
*G06F 11/36* (2006.01)
*G06F 9/44* (2006.01)

(56) References Cited

U.S. PATENT DOCUMENTS

| | | | |
|---|---|---|---|
| 2014/0026121 A1* | 1/2014 | Jackson | G06F 9/44521 717/124 |
| 2014/0082597 A1* | 3/2014 | Chafi | G06F 8/443 717/148 |
| 2016/0216962 A1* | 7/2016 | Wang | G06F 17/30106 |

OTHER PUBLICATIONS

Free Software Foundation, Inc., "Debugging with GDB: the GNU Source-Level Debugger," Section 5.1.8: Dynamic Printf; Tenth Edition, for GDB (GDB) Version 7.8.0.20140731-cvs; downloaded from <<https://sourceware.org/gdb/onlinedocs/gdb/Dynamic-Printf.html>> Jul. 31, 2014, 2 pages.
Hradilek, J. et al., "Red Hat Developer Toolset 1.1 User Guide," Section B.2. Changes in GDB 7.5 , copyright 2012, 2013 Red Hat, Inc.; downloaded from <<https://access.redhat.com/documentation/en-US/Red_Hat_Developer_Toolset/1/html/User_Guide/sect-Red_Hat_Developer_Toolset_1.1-GDB.html>> on Jul. 31, 2014, 8 pages.
Microsoft Visual Studio 2013, "Edit and Continue"; downloaded from <<http://msdn.microsoft.com/en-us/library/bcew296c.aspx>> on Jul. 31, 2014, 1 page.
Stallmann, R. et al., "Debugging with GDB: The GNU Source-Level Debugger," Section 14.7: Fix and Continue Debugging (pp. 120-124); HP Eighteenth Edition, for GDB; Feb. 2008; downloaded from <<http://h21007.www2.hp.com/portal/download/files/unprot/devresource/Tools/wdb/doc/gdb58.pdf>> on Oct. 17, 2014; 7 pages.
Apple, Inc., "Xcode Debugging Guide (Legacy): Modifying Running Code"; Mar. 8, 2011; downloaded from <<https://developer.apple.com/legacy/library/documentation/DeveloperTools/Conceptual/XcodeDebugging/230- Modifying_Running_Code/modifying_running_code_html#//apple_ref/doc/uid/TP40007057-CH10-SW7>> on Oct. 17, 2014, 5 pages.
Wagner, R., et al., "iPhone and Mac Wrox e-Book Bundle: Safari WebKit for iPhone OS 3.0, iPhone SDK Objective-C, Mac OS X Snow Leopard Programming, Professional Xcode 3" The Magic Fix, from <<http://books.google.de/books?id=6kYrQtVgHLIC&pg=PT1579&lpg=PT1579&dq=GCC_ENABLE_FIX_AND_CONTINUE&source=bl&ots=1g1l8a_wOB&sig=DpPwgrEdBvuRc6HQrtw6NrlZqKY&hl=ro&sa=X&ei=GQNaU6ntJo6V7AatnoGoDQ&redir_esc=y#v=onepage&q=GCC_ENABLE_FIX_AND_CONTINUE&f=false>> on Oct. 17, 2014, 4 pages.
Apple, Inc., "Xcode 2.0 User Guide, Chapter 36: Using Fix and Continue," pp. 385-389; Nov. 7, 2006; downloaded from <<http://ebookbrowsee.net/gdoc.php?id=531354365&url=c848c190733ecce6cb5de58e74fbdbc3>> on Jul. 31, 2014, 7 pages.
Apple, Inc., "Xcode Build System Guide (Legacy): Build Configurations," Mar. 8, 2011; downloaded from <<https://developer.apple.com/legacy/library/documentation/DeveloperTools/Conceptual/XcodeBuildSystem/400- Build_Configurations/build_configs.html#//apple_ref/doc/uid/TP40002692-SW2>> on Oct. 17, 2014, 12 pages.

* cited by examiner

METHOD FOR ALTERING EXECUTION OF A PROGRAM, DEBUGGER, AND COMPUTER-READABLE MEDIUM

CROSS REFERENCE TO RELATED APPLICATION(S)

The present application claims priority to Romanian Patent Application No. RO A 2014 00660, entitled "METHOD FOR ALTERING EXECUTION OF A PROGRAM, DEBUGGER, AND COMPUTER-READABLE MEDIUM," filed on Aug. 29, 2014, the entirety of which is herein incorporated by reference.

FIELD OF THE INVENTION

This invention relates to a method for altering execution of a program, to a debugger, and to a computer-readable medium.

BACKGROUND OF THE INVENTION

A programmer developing a piece of software, e.g., a program or parts of a program, needs to perform test runs of the software that is being developed. A test run of the software helps the programmer to find and correct errors in the software. Software errors are also referred to as bugs. The process of finding and eliminating bugs in a piece of software is known as debugging. A debugger is a software tool, i.e., another program for enabling the programmer to carry out various debugging actions. A compiler is a software tool, i.e., an executable code, for compiling the program, i.e., for translating a source code of the program into an executable code. A debugger may enable the programmer to monitor the values of variables of the program during a test run of the program. A debugger and a compiler may be integrated in a software development tool.

For instance, the debugger may enable the programmer to define breakpoints of the program. A break point is a point in the program at which the computer executing the program will suspend execution of the program to give the programmer time for e.g. analyzing output produced by the program or for analyzing the values of monitored variables of the program. When the computer has suspended execution of the program at a breakpoint, the debugger may enable the programmer to prompt the computer to resume execution of the program.

When execution of the program is suspended, e.g., at a breakpoint, the programmer may wish to modify the program. For instance, the programmer may wish to modify a part of the program located after the breakpoint, i.e., a part of the program that will be executed when the programmer prompts the computer, via the debugger, to resume execution of the program. For example, the programmer may wish to remove a certain instruction after the break point, or the programmer may wish to insert one or more instructions immediately after the breakpoint or further on in the program. For example, the programmer may wish to add an instruction for generating additional output on a screen.

A common practice among programmers involves modifying a source code of the program, compiling the modified source code, and executing the resulting executable code. In other words, modifying a program and debugging the modified program may involve starting a new test run of the program. This may involve executing the modified program until the breakpoint even when the modified program is identical to the original program at least up to the breakpoint, assuming that the program has been modified only after the breakpoint.

SUMMARY OF THE INVENTION

The present invention provides a method, a debugger, and a computer-readable medium as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
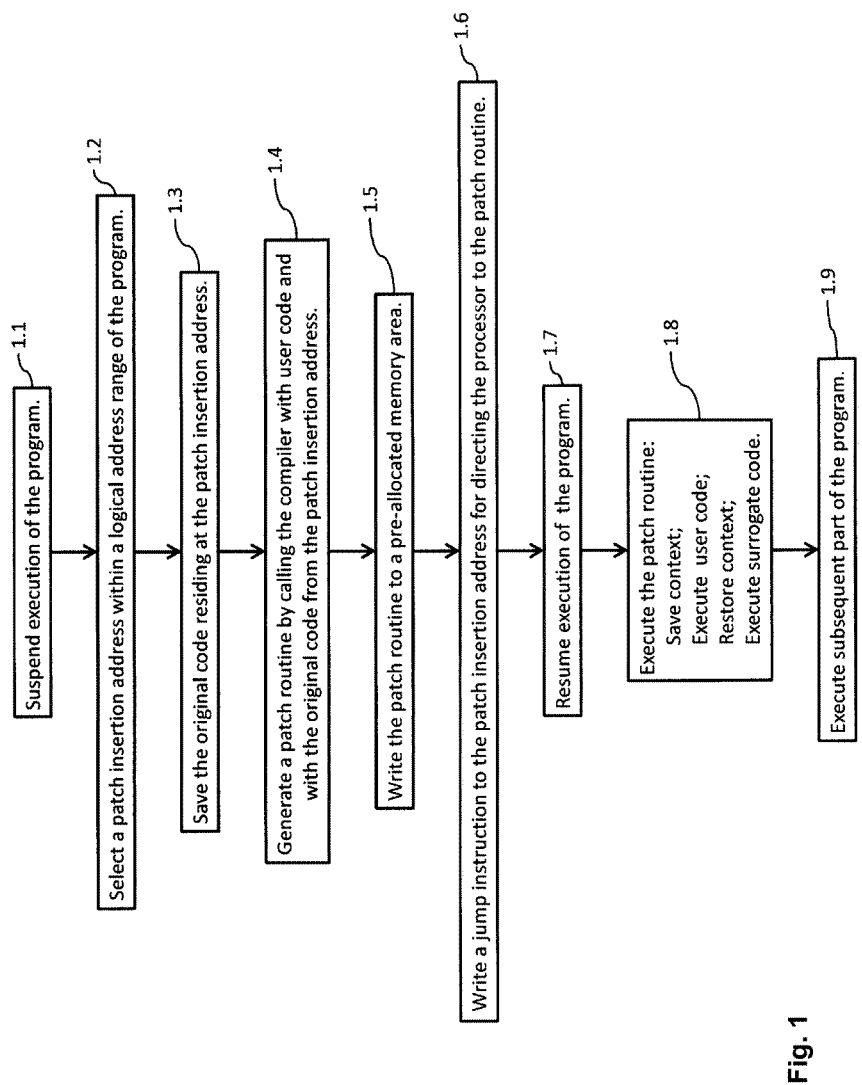
FIG. 1 shows a flowchart of an example of a method for debugging a program

In the example of FIG. 1, a user, e.g., a program developer, may operate a computer to execute a debugger. The debugger may, in turn, control the computer to do a test run of a program. The computer may comprise one or more processor cores for executing the debugger. The debugger may provide the user with a graphical user interface (GUI). The GUI may, for instance, enable the user to trigger a variety of actions for debugging the program. For example, the GUI may be arranged to enable the user to define one or more breakpoints, to specify one or more variables of the program that will be monitored during the test run, to compile a source code of the program, and to link executable pieces of code to generate an executable version of the program, i.e. an executable code for instructing the one or more processors of the computer to execute the program.

For the sake of clarity and simplicity, the operations described below may be described without explicit reference to the debugger. It is to be understood that all of these operations can be initiated or be carried out by the debugger, or by a development tool comprising a debugger. More specifically, the debugger may be arranged to control the computer to carry out the operations described below, possibly in dependence of user input. The user input may be received by the debugger via a suitable user interface, e.g., via a graphical user interface (GUI) or via any other kind of suitable interface, e.g., via a text-based interface.

In the example, the debugger may prompt the computer to suspend execution of the program (box 1.1), e.g., in response to reaching a user-defined breakpoint or in response to a suspend action initiated by the user. Suspending execution of the program may include conserving a context of the program so as to enable the computer to resume execution of the program at a later point in time, e.g., as if the program had not been suspended. The context of the program may include the values of variables of the program, e.g., the values of registers that are assigned to the program. Suspending execution of the program may give the user time to analyze the behavior of the program up to the current point of execution, e.g., up to the current value of the program counter. For instance, the programmer may be enabled to study the values of variables and branch conditions of the program up to the current point.

As a result of such analysis, the user may wish to modify the behavior of the program at a point in the program flow that will be reached, or which has a certain probability of being reached, when execution of the program is resumed. The debugger may therefore be arranged to allow the user to select a patch insertion address located within a logical address range of the program (box 1.2). The patch insertion address may, in principle, be located anywhere within the logical address range of the program. Conveniently, the user may select the patch insertion address such that the computer will reach the patch insertion address after resuming execution of the program. In other words, the patch insertion address may be chosen such that a program counter associated with the program will eventually reach the patch insertion address.

The debugger may then save the original code residing at the patch insertion address (box 1.3). The debugger may further generate a patch routine, e.g., by calling the compiler with user code and with the original code from the patch insertion address, and possibly with additional information (box 1.4). The additional information may include, for example, location information or a calling convention for all variables and functions referred to in the user code to the compiler, e.g., in an intermediary language understood by the compiler (box 1.4). The thus generated patch routine may notably comprise surrogate code which is equivalent to the original code from the patch insertion address, as will be explained further below.

The patch routine may, for example, be written to a pre-allocated memory area (box 1.5), i.e., to a memory region allocated to the program prior to starting execution of the program. The pre-allocated program memory may, for instance, be pre-allocated to the program for storing temporary variables. Furthermore, a jump instruction may be written to the patch insertion address (box 1.6), for directing the processor to the patch routine, e.g., to a start address of the patch routine. In other words, the processor may be redirected from the patch insertion address to the start address of the patch routine.

The debugger may then resume execution of the program (box 1.7). The debugger may thus prompt the computer to carry on execution of the program at the current point, i.e., at the point in the program flow where execution was suspended. The program may now include the patch routine arranged to be called from the patch insertion address (box 1.4). Depending on the patch insertion address, the computer executing the program may reach the patch insertion address immediately after the current point or only after executing one or more instructions of the original program. In either case, the computer may execute the patch routine (box 1.8).

Execution of the patch routine may notably prompt the computer to execute the user-defined code, referred to herein as a user code. The user code may be included in the patch routine or comprise external code not included in the patch routine. If the user code comprises external code, i.e., if the user code is not completely contained in the patch routine, the compiler may use a calling convention and a start address, e.g., provided in an intermediary language, in order to generate machine code that calls the external code. The user code may comprise one or more instructions defined by the user, e.g., instructions for printing the values of certain variables, e.g., variables not monitored by the debugger in the current test run of the program, or an instruction for setting a variable to another value, or a jump the another part of the program, e.g., a later part of the program, so as to bypass one or more instructions of the program, or instructions for altering execution, or for generating additional output on a screen. The debugger may be designed to enable the user to define the user code in a convenient manner, e.g., using a graphical user interface. For example, the debugger may provide a dedicated window for enabling the user to enter user source code, and the debugger may further be arranged to compile the user source code, thereby translating the user source code into the user code.

The patch routine may be designed such that the computer, after executing the user code, will execute the surrogate code. As mentioned above, the surrogate code may be equivalent to the original code that resided at the patch insertion address and that was overwritten with a pointer to the patch routine. A program or routine is equivalent to another program or routine if both programs or routines produce the same output, given the same input.

The patch routine may terminate with a jump back to the original program, e.g., to the next valid address, that is, the address that would have been reached by the original code that resided at the patch insertion address. The program may further be executed from the next valid address (box 1.9).

Execution of the program may thus be altered without recompiling the entire program.

Figure 2:
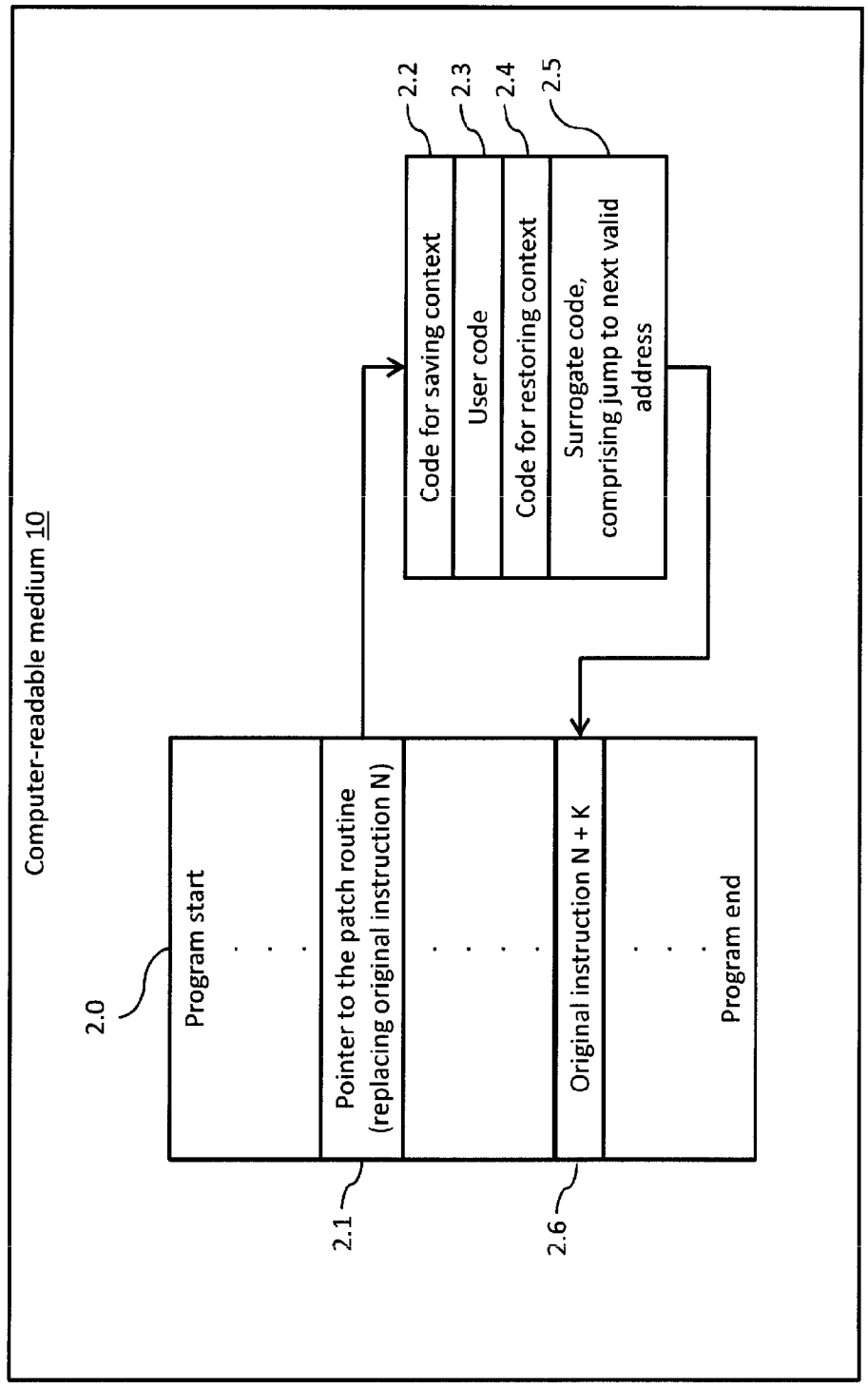
FIG. 2 schematically shows an example of an embodiment of a patch routine

Referring now to FIG. 2, an example of a program (box 2.0) including a patch routine (box 2.2-2.5) is described. The program may reside on a computer-readable medium 10, e.g. in a computer. The computer-readable medium may have executable instructions stored on it, for prompting a computer to generate an instance of the debugger, or an instance of a development tool comprising the debugger and the compiler.

In the example, the patch routine comprises, in this order, code for saving a current context of the program (box 2.2), user code (box 2.3), code for restoring the context (box 2.4), and a surrogate code (box 2.5). The surrogate code may be generated on the basis of original code that resided at the patch insertion address (box 2.1) before it was overwritten with a jump direction to the patch routine. The surrogate code may be generated such that is equivalent to the original code. The surrogate code may be executed as part of the patch routine. Since the surrogate code will be located at a different address, the original code may need to be translated or otherwise modified to generate the surrogate code (box 2.5). For example, the original code at the patch insertion address may be translated into the surrogate code instruction by instruction, while addresses may be adapted. Notably, the surrogate code may terminate with a jump to a next valid address (box 2.6).

The code for saving the context (box 2.2) may instruct the computer to save a current context of the program that is being debugged, i.e., a context of the program when the computer starts executing the patch. The context may comprise or consist in a data context of the program. The data context may comprise, for instance, the values of temporary registers of the program, i.e., of registers assigned to the program at the respective point in the program flow. The user code may comprise any user-defined instructions.

The user code (box 2.3) may, for example, comprise user defined instructions that will be executed immediately after saving the current context. For example, the user code may prompt the computer to perform one or more of the following actions: initialize a previously uninitialized variable, add additional code for debugging, add additional code for generating output on a screen, and call functions.

The user-defined instructions included in the user code may include one or more additional "returns" from the current function. This approach may allow the user to avoid executing the rest of the function, thus allowing to overwrite the rest of the function's code. When a "return" is encountered in the user code, before this return is executed, the computer will execute the code for restoring the context (box 2.4). This code for restoring the context may comprise a restore of the context that was saved by the code (box 2.2) and a restore of the context for the function where the patch was inserted. The compiler is responsible for generating the restore context code and the corresponding machine instruction for function exit and for arranging them correctly inside the restore context block (box 2.4). When the user code does not contain any return instructions, the code for restoring the context (box 2.4) may instruct the computer to restore the original context, i.e., the context that was saved by the code (box 2.2) for saving the current context. The context may thus be reestablished.

As the surrogate code is provided at an address different from the patch insertion address, i.e., elsewhere with respect to the original code, one or more instructions of the original code may need to be modified to generate the surrogate code. E.g., relative branches or short branches may be converted to long branches (box 2.5). The surrogate code may therefore also be referred to as the translated opcode or translated original code. As mentioned above, the surrogate code may comprise, e.g., at its end, a jump back to the original program. More specifically, the jump back to the original program may be a jump to an address, referred to herein as the address of the next valid instruction or as the next valid address, at which the computer would have arrived by executing the original code at the patch insertion address, starting with the saved context. For example, the jump back to the original program may instruct the computer to continue executing the program immediately after the patch insertion address. In another example, the original code at the patch insertion address comprises a jump to a certain address. The surrogate code may in this case instruct the computer to jump to that certain address.

Thus, the address of the next valid instruction may, for instance, be the next address after the patch insertion address. However, there may be situations where the jump instruction inserted at the patch insertion address is longer than the original instruction found at the patch insertion address. In such a situation, the next valid instruction may be the next instruction not affected by the insertion of the jump to the patch routine.

The debugger may thus enable a user to insert a user-defined action into the normal program flow. After completing the user defined action, the computer may execute the rest of the original program as if no patch had been inserted.

Figure 3:
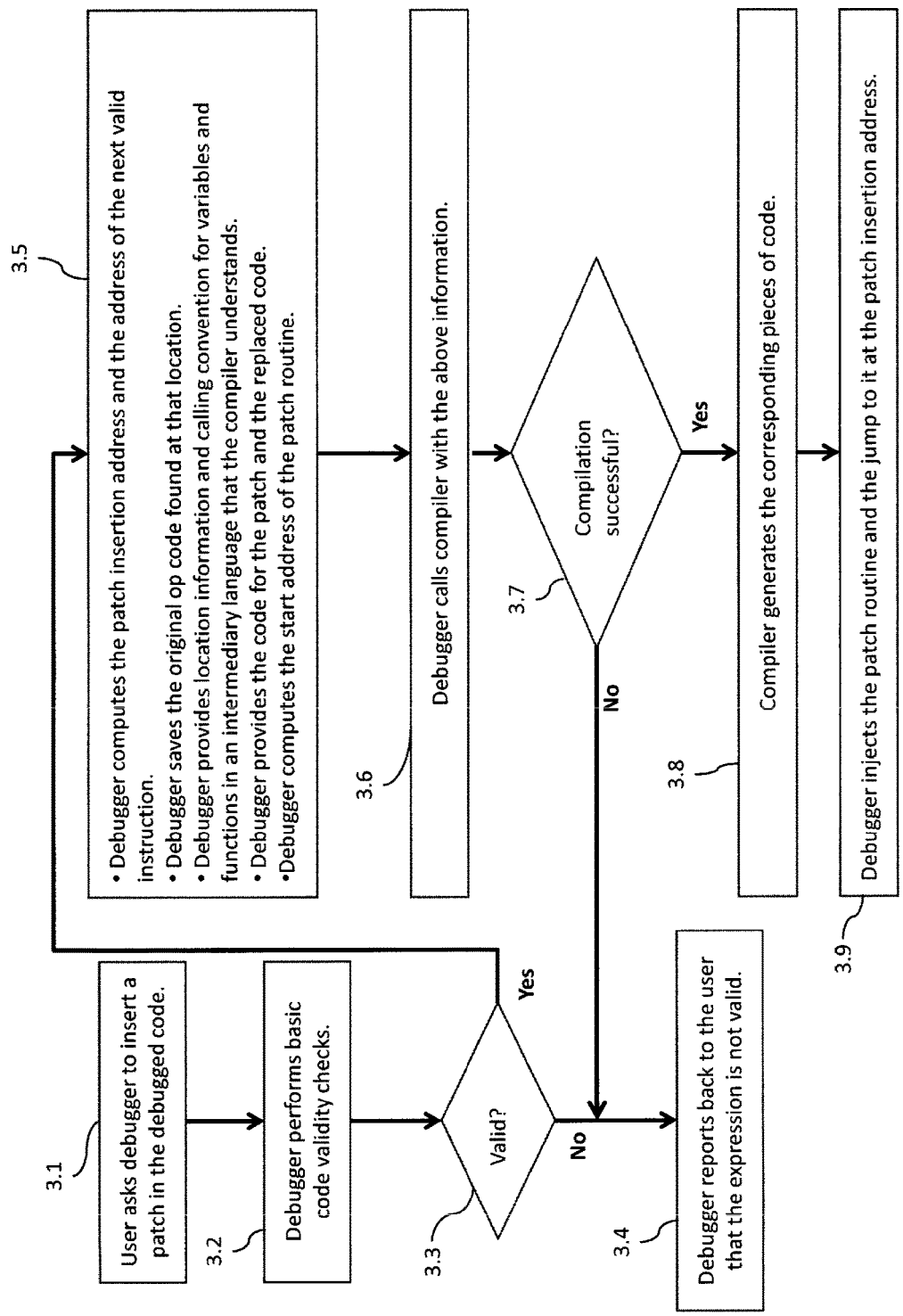
FIG. 3 shows a flowchart of an example of an embodiment of cooperation between a debugger and a compiler in order to set up a patch for a program to be debugged.

Referring now to FIG. 3, an example of a method of operating a debugger is described. The method may start with the debugger controlling the computer to execute the program until, e.g., a certain address is reached. The user may want to insert a patch into the program, i.e., to add a piece of code in the program by asking the debugger to insert a patch (box 3.1). The debugger may then perform various basic code validity checks (box 3.2). Notably, the debugger may check a user code defined by the user. If the validity checks fail (box 3.3), the debugger may report back to the user that, e.g., the user code is not valid, or that a certain expression provided by the user is not valid (box 3.4). If, however, the validity checks are successful, the debugger may perform a series of setup operations (box 3.5) in order to prepare the modified program. For instance, the debugger may compute the start address of the patch routine and the address of the next valid instruction. The debugger may then save the original program code (opcode) found at the patch insertion address. The debugger may then provide information, e.g., location information, or a calling convention, for all variables and functions referred to in the user code to a compiler, e.g., in an intermediary language that the complier understands. The debugger may further provide the compiler with the user code (box 2.3), and with the replaced code, i.e., the original code from the patch insertion address. The debugger then calls the compiler (box 3.6) with the information generated by the operations described with reference to box 3.5. If the compilation is successful (box 3.7), the compiler may generate the patch (box 3.8). The generated pieces of code may have the structure described in reference to FIG. 2. The debugger may then write the patch to the patch insertion address (box 3.9). Thus, the modified version of the program may be generated. The debugger may then resume execution of the program at the current point, using the modified version of the program instead of the original version. The patch may later be removed, e.g., when the user has requested reverting back to the original version. If, however, the compilation fails (box 3.7), the process flow may continue with box 3.4 described above.

Restoration of the original program may be achieved by restoring the original opcode at the patch insertion address. Furthermore, the memory area containing the patch routine may be marked as free.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer-readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method for altering execution of a program on a computer, wherein the program resides in a memory unit that has a logical address space assigned to it, and wherein the method comprises:
   operating the computer to start executing the program;
   operating the computer to suspend execution of the program;
   selecting a patch insertion address within a logical address range of the program,
   saving original code residing at the patch insertion address;
   generating a patch routine comprising user-defined code for modifying a function of the program;
   writing a jump instruction to the patch insertion address, thus overwriting said original code, wherein the jump instruction is arranged to instruct the computer to jump to a start address of the patch routine;
   compiling only the patch routine without recompiling the entire program; and
   operating the computer to resume execution of the program;
   wherein the patch routine is arranged to prompt the computer to:
   save a current context of the program;
   execute the user-defined code;
   restore the saved current context of the program; and
   execute a surrogate code which is equivalent to said original code, and
   wherein the patch insertion address is selected such that said action of operating the computer to resume execution of the program prompts the computer to reach the patch insertion address and, accordingly, to execute the patch routine.

2. The method of claim 1, wherein generating the patch routine comprises: compiling the patch routine on the basis of the following: a source code of the user-defined code and said original code.

3. The method of claim 1, comprising: generating the user-defined code by compiling a source code of the user-defined code.

4. The method of claim 1, comprising: storing the patch routine in pre-allocated program memory.

5. The method of claim 1, wherein the method comprises: enabling a user to select the patch insertion address.

6. The method of claim 1, wherein the method comprises: enabling a user to define the user-defined code.

7. The method of claim 1, further comprising:
   restoring the original code at the patch insertion address.

8. The method of claim 1, further comprising providing a user interface for prompting a computer to execute the method in dependence of user input received from a user via the user interface.

9. The method of claim 8, wherein the user interface comprises a graphical user interface.

10. The method of claim 8, further comprising storing executable instructions for performing the method on a non-transitory computer-readable medium.

* * * * *